US006301374B1

(12) United States Patent
Stringa

(10) Patent No.: US 6,301,374 B1
(45) Date of Patent: *Oct. 9, 2001

(54) METHOD FOR AUTOMATICALLY CHECKING THE PRINTING QUALITY OF A MULTICOLOR IMAGE

(75) Inventor: Luigi Stringa, Trento (IT)

(73) Assignee: De La Rue Giori S. A., Lausanne (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,421

(22) Filed: Mar. 17, 1997

(30) Foreign Application Priority Data

Mar. 22, 1996 (IT) .............................................. MI96A0568

(51) Int. Cl.7 ........................................................ G06K 9/00

(52) U.S. Cl. ............................................ 382/112; 382/162

(58) Field of Search ..................................... 382/112, 162; 356/402, 404; 358/504; 250/559.44, 559.39; 385/109

(56) References Cited

U.S. PATENT DOCUMENTS

| | | | | |
|---|---|---|---|---|
| 4,488,808 | * | 12/1984 | Kato | 356/402 |
| 4,649,502 | * | 3/1987 | Keller et al. | 356/402 |
| 4,665,496 | * | 5/1987 | Ott | 382/112 |
| 4,685,139 | * | 8/1987 | Masuda et al. | 382/112 |
| 4,881,181 | * | 11/1989 | Jeschke et al. | 356/406 |
| 5,058,175 | * | 10/1991 | Aso | 382/112 |
| 5,125,037 | * | 6/1992 | Lehtonen et al. | 382/112 |
| 5,144,566 | * | 9/1992 | Anderson et al. | 382/112 |
| 5,163,012 | * | 11/1992 | Wuhrl et al. | 382/112 |
| 5,181,257 | * | 1/1993 | Steiner et al. | 101/211 |
| 5,255,329 | * | 10/1993 | Tanimizu et al. | 382/112 |
| 5,315,415 | * | 5/1994 | Kawai et al. | 358/515 |
| 5,317,390 | * | 5/1994 | Bolza-Schunemann et al. | 356/394 |
| 5,384,859 | * | 1/1995 | Bolza-Schunemann et al. | 382/112 |
| 5,471,809 | * | 12/1995 | Bolza-Schunemann | 356/394 |
| 5,625,703 | * | 4/1997 | Okuda et al. | 382/112 |
| 5,767,980 | * | 6/1998 | Wang et al. | 358/298 |

FOREIGN PATENT DOCUMENTS

| | | | | |
|---|---|---|---|---|
| 0 127 831 | | 12/1984 | (EP) . | |
| 0 443 062 | | 8/1991 | (EP) . | |
| 0 598 490 | | 5/1994 | (EP) . | |
| 0 705 784 | | 4/1996 | (EP) . | |
| 2258039 | * | 1/1993 | (GB) | 382/112 |
| WO-A 942 5278 | | 11/1994 | (WO) . | |

OTHER PUBLICATIONS

Gonzalez et al. "Digital Image Processing" Addison Wesley Publishing Company, Inc. pp. 26–28, Sep. 1993.*

* cited by examiner

*Primary Examiner*—Jon Chang
*Assistant Examiner*—Jingge Wu
(74) *Attorney, Agent, or Firm*—Bugnion S.A.; John Moetteli

(57) ABSTRACT

A sheet of paper (1) with the image to be checked passes in front of a camera (3) designed to capture three chromatic images and to emit three signals (S1, S2, S3). These signals are introduced into a device (4) applying a function F which comprises coefficients (K1, K2, K3, K10, K20, K30) previously recorded in a suitable device (2). The single signal (5) resulting from the function F is delivered to a device (6) for checking the printing quality.

13 Claims, 1 Drawing Sheet

FIG. 1
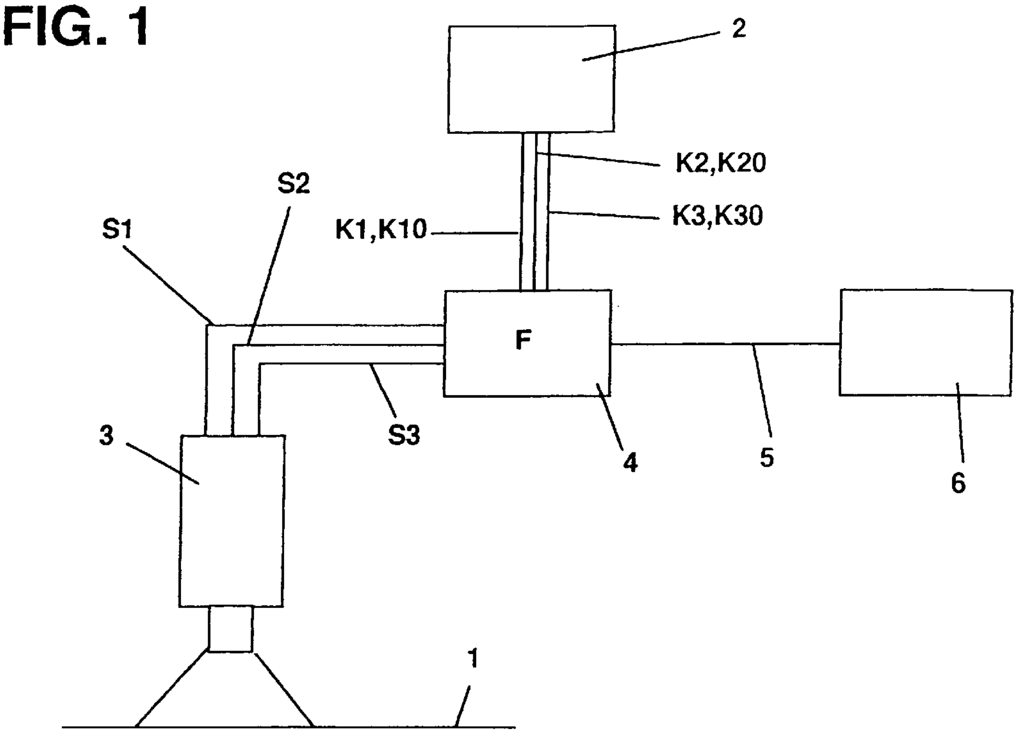
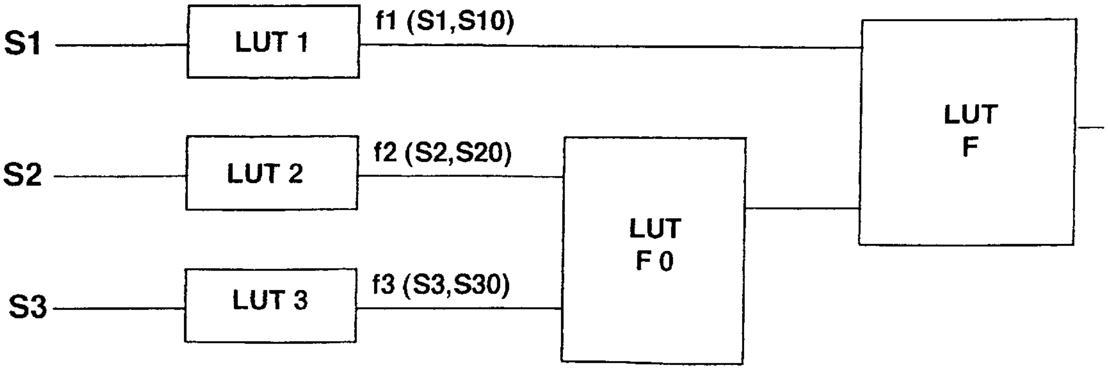
FIG.2

METHOD FOR AUTOMATICALLY CHECKING THE PRINTING QUALITY OF A MULTICOLOR IMAGE

FIELD OF THE INVENTION

The present invention relates to a method for automatically checking the printing quality of a multicolor image by means of at least one optoelectronic device enabling one signal Si per chromatic channel to be obtained.

PRIOR ART

Methods and installations for automatically checking the printing quality of a multicolor image have, more especially, but not exclusively, been developed for checking the printing quality of security papers, such as bank notes or fiduciary papers. The various methods and installations for automatically checking the printing quality do so by comparing pixel by pixel or a set of pixels of certain characteristic parts of an image with a reference image. The image to be checked is captured by a system of cameras allowing one capture per chromatic channel and these results are compared with the results of the capture of a reference image. Part of an image is considered to be defective when the densitometric value of a pixel in the chromatic components departs from the model which has a certain predetermined value and which essentially depends on the degree of printing quality desired.

The methods and devices for automatically checking the quality of color printing obviously give superior results to the results obtained using monochromatic systems. Nevertheless, the volume of data to be captured and checked is much greater than is the case in monochromatic checking, thereby making the operation expensive. If it is desired to obtain the same speed as achieved when carrying out monochromatic quality checking, the devices used must be powerful, which increases their cost. Thus, for multicolor checking, for example for the three base colors of red, green and blue, the number of channels is multiplied by three and the operations performed are also multiplied by three compared with monochromatic inspection.

SUMMARY OF THE INVENTION

The object of the present invention is to allow automatic quality control of a multicolor image, but by substantially reducing the cost without this decrease impairing the capability of chromatic detection of defects in the image to be checked.

Another object is to increase the defect detection capacity compared to conventional multicolor systems.

The method according to the invention is one in which the signals Si obtained for the same image or part of the image are combined so as to obtain a single signal which will be delivered to a device for automatically checking the printing quality for each image or part of the image with respect to a reference image or part of a reference image, the combination of said signals being a function F, on the one hand, of the values of signals Si from each chromatic channel and, on the other hand, of the value Si0 from a reference image or a corresponding part of a reference image, said function having the purpose of maximizing the detectability of differences between the checked image and the reference image.

The advantages of the method according to the invention are that, although a multicolor image is being checked, the signal used to do the actual checking, that is to say the comparison with the reference image, uses a single channel since the signal in question consists of a function of each of the chromatic channels, making it possible to amplify the detectability of the differences in each of the values captured with respect to the corresponding value of a reference image.

The method thus defined by the present invention makes it possible, on the one hand, to decrease the cost of processing the multi-channel signal and, on the other hand, not to decrease the detectability of the magnitude of the chromatic defects which might be present in one or other of the chromatic channels by a judicious choice of the function and of the coefficients.

In the same way, by judiciously choosing the coefficients, it is possible to amplify the chromatic response within a more significant band for that part of the image being inspected.

According to one embodiment of the invention, the coefficients are defined automatically, for example during capture of the reference image.

According to another embodiment, the coefficients are determined by the operator.

According to another embodiment, that part of the image to which the matrix of coefficients corresponds may be of the order of one pixel.

According to another embodiment, the chosen function is defined according to an approximation of the human eye's response to differences in color.

According to another embodiment, the function F is decomposed into a set of partial functions applied to some of the chromatic signals.

According to another embodiment, it is possible to define more than one matrix of coefficients for each part to be checked in order to take into account acceptable variations with respect to the reference image.

The invention also relates to an installation for implementing the method.

The installation comprises one capture device per chromatic channel of the image to be checked, a device for storing coefficients in memory, a device for producing the function and a device for processing the single signal resulting from the function F in order to compare it with the signal corresponding to the reference image.

According to a preferred embodiment, the device which makes it possible to produce the function is composed of at least one look-up table.

The image capture device may be either a matrix camera or a linear camera.

BRIEF DESCRIPTION OF THE DRAWINGS

The invention will be described in more detail with the aid of the appended drawing.

FIGS. 1 and 2 represent a diagrammatic view of two installations for implementing the method.

DESCRIPTION OF THE PREFERRED EMBODIMENTS

Although the method may be applied to the quality control of multicolor printing on any object whatsoever, we have shown here a sheet of paper 1 which is subjected to quality control of the printing on this sheet. A matrix of coefficients Ki, Ki0 is determined beforehand for the parts to be checked, a part possibly being even the size of one pixel, and these coefficients are stored in memory in a storage device 2. The matrices with the coefficients Ki, Ki0 are determined either by the operator, depending on the image to be checked, or automatically, for example by capturing the reference model, with an appropriate software package making it possible to generate the coefficients for each part to be checked according to predetermined criteria.

Thereafter, the image printed on the object 1 is captured by means of an optoelectronic device 3 designed to capture each chromatic channel. This electronic device may be a group of optical devices such as matrix or linear cameras or any other equivalent device. Usually, but not exclusively, three chromatic channels are used: red, green and blue. These three channels S1, S2, S3 send their signals into a device 4 which enables the function F to be applied to the signals emitted by the device 3. The coefficients K1, K10, K2, K20, K3, K30 are introduced into the device via appropriate lines.

After having obtained the function F of these three signals, a single signal 5 is delivered to a device 6 which enables the signal to be processed in order to check the printing quality. This device is a standard device for carrying out monochromatic quality control. It is obvious that, beforehand, the reference image was captured in the same manner and a single signal, composed of the weighted sum of the various signals emitted by the chromatic channels, was produced.

Assuming that the function $F=\Sigma ki(Si-Ki0\ Si0)$, where i=1 to n, it is possible to distinguish various cases:

1. if Ki0=0, the simple combination of chromatic channels of the checked image is obtained;
2. if Ki0=1, the weighted sum of the difference in each of the chromatic signals with respect to the value of the reference image is obtained.

It is also possible to use a function corresponding to an approximation of the human's eye response to differences in color, which may be determined in the following way: F (Si, Si0)=f (Ki log Si/Si0).

According to another embodiment, it is possible to decompose the function F into partial functions applied to some of the signals; for example, in the case of three signals, the following may be written:

$$F(S1, S10, S2\ S20, S3\ S30)=F(f1\ (S1, S10), F0\ (f2\ (S2, S20), f3\ (S3, S30))).$$

It is possible to replace the device 4 by one or more look-up tables in order to implement both this function and the previously mentioned function.

In FIG. 2, we have represented the case of the previous function F by means of five tables LUT:

$$F(Si, Si0)=\Sigma Ki(Si-Ki0\ Si0)$$

LUT 1 produces $K1\ (S1-K10\ S10)$

LUT 2 produces $K2\ (S2-K20\ S20)$

LUT 3 produces $K3\ (S3-K30\ S30)$ while LUT F0 produces $$K2\ (S2-K20\ S20+K3(S3-K30\ S30)$$

and LUT F produces the sum of results obtained at the output of LUT 1 and LUT F0.

The method has the additional advantage of making it possible to amplify the chromatic response within a band which is more relevant to the portion of the image to be checked. Thus, for example, if an image which is predominantly red is being examined, the most relevant channel for the inspection is the blue channel. In this case then, the coefficients will be chosen so as to minimize the effect of red and green, while the effect of blue will be maximized. In this way, the chromatic response is amplified within the band which is most appropriate as a function of the image to be checked instead of giving the same weight to each of the signals emitted by the various chromatic channels. Thus, in the case in which an area or pixel is white, the value of each of the coefficients will be equal, for example, to 1.

It is obvious that other functions can be used to increase the detectability of the differences between the image to be checked and the reference image.

What is claimed:

1. A method for automatically checking the printing quality of a multicolor image by means of at least one optoelectronic device enabling one color signal Si per chromatic channel to be obtained, wherein color signals Si0, obtained for the reference image or part of the same image are combined so as to obtain a single signal S, representative of all colors checked, which will be delivered to a device for automatically checking the printing quality for each image or art of the image with respect to a reference image or part of a reference image, the combination of said signals being a function F of he values of signals Si from each chromatic channel and of the value Si0 from a reference image or a corresponding part of a reference image, said function F being of the form: F(Si, Si0)=f(Ki log Si/Si0), i varying from 1 to n, n being the number of chromatic channels used by the checking apparatus, said function corresponding to an approximation of the human eye's response to differences in color, said function having the purpose of maximizing the detectability of differences between the checked image and the reference image.

2. The method as claimed in claim 1, wherein said function F has the form:

$$S=F(Si, Si0)=\Sigma Ki(Si-Ki0\ Si0),$$

i varying from 1 to n, n being the number of chromatic channels used for the checking operation and Ki and Ki0 being suitable coefficients.

3. The method as claimed in claim 2, wherein a matrix of coefficients Ki, Ki0 is determined for each image or part of the image to be checked, wherein the image to be checked is captured by means of an optoelectronic device so as to obtain one signal Si per chromatic channel and wherein the values of signals Si and the coefficients Ki, Ki0 corresponding to the part of the image to be checked are introduced into the function F.

4. The method as claimed in claim 3, wherein the matrix of coefficients Ki, Ki0 is determined automatically as a function of the chromatic distribution of the reference image.

5. The method as claimed in claim 3, wherein the matrix of coefficients Ki, Ki0 is determined by the operator.

6. The method as claimed in claim 1, wherein the function F may be a combination of other partial functions between the various signals Si.

7. The method as claimed in claim 6, wherein, in the case of three chromatic channels, said function has the form F (S1, S10, S2, S20, S3 S30)=F (f1 (S1, S10), F0 (f2 (S2, S20), f3 (S3, S30))).

8. The method as claimed in claim 1, wherein the parts of the checked image are of the size of one pixel.

9. The method as claimed in claim 1, wherein more than one matrix of coefficients is defined for each part of the image to be checked in order to take into account acceptable variations in the image to be checked with respect to the reference image.

10. An installation for implementing the method as claimed in claim 1, which comprises one image capture device (3) per chromatic channel, a device (2) for storing the coefficients Ki, Ki0 in memory, a device (4) for producing the function F of the signals (S1, S2, S3) captured by each capture device (3) and a device (6) for processing the single signal (5) resulting from the function F.

11. The installation as claimed in claim 10, wherein the device for producing the function F is composed of at least one look-up table.

12. The installation as claimed in claim 10, wherein the camera is a matrix camera.

13. The installation as claimed in claim 10, wherein the image capture device is a linear camera.

* * * * *